US012746858B2

(12) United States Patent
Kim et al.

(10) Patent No.: US 12,746,858 B2

(45) **Date of Patent: *Sep. 29, 2026**

(54) WALK-IN APPARATUS OF VEHICULAR SEAT

(71) Applicant: Hyundai Transys Inc., Seosan-si (KR)

(72) Inventors: Sang Min Kim, Hwaseong-si (KR); Jung Bin Lee, Hwaseong-si (KR); Jun Kyu Kim, Hwaseong-si (KR)

(73) Assignee: Hyundai Transys Inc., Seosan-si (KR)

(*) Notice: Subject to any disclaimer, the term of this patent is extended or adjusted under 35 U.S.C. 154(b) by 328 days.

This patent is subject to a terminal disclaimer.

(21) Appl. No.: 18/592,658

(22) Filed: Mar. 1, 2024

(65) Prior Publication Data

US 2024/0294100 A1 Sep. 5, 2024

(30) Foreign Application Priority Data

Mar. 2, 2023 (KR) ........................ 10-2023-0027823

(51) Int. Cl.

| | |
|---|---|
| ***B60N 2/20*** | (2006.01) |
| ***B60N 2/02*** | (2006.01) |
| ***B60N 2/08*** | (2006.01) |
| ***B60N 2/12*** | (2006.01) |
| ***B60N 2/30*** | (2006.01) |
| ***B60N 2/90*** | (2018.01) |

(52) U.S. Cl.

CPC ......... *B60N 2/3031* (2013.01); *B60N 2/0837* (2013.01); *B60N 2/12* (2013.01)

(58) Field of Classification Search

CPC .. B60N 2/02246; B60N 2/12; B60N 2/02253; B60N 2/04; B60N 2/20; B60N 2/206; B60N 2/30; B60N 2/3011; B60N 2/3047; B60N 2/3054

See application file for complete search history.

(56) References Cited

U.S. PATENT DOCUMENTS

| | | | | |
|---|---|---|---|---|
| 10,442,322 | B2 * | 10/2019 | Handigol | B60N 2/1695 |
| 12,576,755 | B2 * | 3/2026 | Lee | B60N 2/12 |
| 2011/0049953 | A1 * | 3/2011 | Champ | B60N 2/3011<br>296/65.09 |
| 2017/0001546 | A1 * | 1/2017 | Keyser | B60N 2/2227 |
| 2019/0152352 | A1 * | 5/2019 | Handigol | B60N 2/12 |
| 2023/0049867 | A1 | 2/2023 | Suk et al. | |
| 2023/0382274 | A1 * | 11/2023 | Mochizuki | B60N 2/02246 |
| 2024/0294097 | A1 * | 9/2024 | Lee | B60N 2/12 |
| 2024/0294098 | A1 * | 9/2024 | Lee | B60N 2/02246 |
| 2024/0294100 | A1 * | 9/2024 | Kim | B60N 2/3031 |

FOREIGN PATENT DOCUMENTS

| | | |
|---|---|---|
| KR | 10-2017-0056744 A | 5/2017 |
| KR | 10-2022-0077489 A | 6/2022 |

* cited by examiner

*Primary Examiner* — Shin H Kim

(74) *Attorney, Agent, or Firm* — Bridgeway IP Law Group, PLLC; Jihun Kim

(57) ABSTRACT

Proposed is a walk-in apparatus provided in a vehicular seat, which includes: an actuator driven by manipulation of a walk-in manipulation unit of a user; a folding unit operated actuated by the actuator and folding a seat back forward; a tilting unit interlocking with the actuation of the folding unit and tilting the seat; and a sliding unit interlocking with the tilting unit and moving the seat forward, in which a link connecting the seat to the movable rail is restricted to rotation for tilting by an engagement structure.

10 Claims, 14 Drawing Sheets

WALK-IN APPARATUS OF VEHICULAR SEAT

CROSS-REFERENCE TO RELATED APPLICATIONS

This application claims priority to and the benefit of Korean Patent Application No. 10-2023-0027823 filed in the Korean Intellectual Property Office on Mar. 2, 2023, the entire contents of which are incorporated herein by reference.

TECHNICAL FIELD

The present invention relates to a walk-in apparatus of a vehicular seat.

BACKGROUND ART

In an RV vehicle, or a 3-door type vehicle, some seats have a walk-in function to get on and off rear seat passengers.

The walk-in function of the seat is a function in which when a passenger on a rear seat manipulates a walk-in level of a front seat in a state in which the passenger is set to sit, a seat back is folded forward at a predetermined angle as illustrated in FIG. 1, or the seat slides forward by a predetermined distance while the seat back is tilted as illustrated in FIG. 2, and refers to a function for the passenger on the rear seat to easily get on and off by securing a space between a front seat and the rear seat through the function.

Meanwhile, in the walk-in apparatus, in the related art, a walk-in memory apparatus is proposed which allows the memory module to store a walk-in operation point while being suspended on a walk-in rail when the seat is moved forward by walk-in, if a lock member dragging the memory module is unlocked from the memory module.

However, the walk-in apparatus has a problem in that a locking structure of the memory module and the lock member, and a structure of the memory module for a memory function are also configured to be complex, so cost and weight of the apparatus increase.

SUMMARY OF THE INVENTION

The present invention is contrived to solve a problem of a background art, and has been made in an effort to provide a walk-in apparatus which has a mechanically simple configuration, and has an improved structure so as to achieve tilting and sliding simultaneously only by button manipulation of a user.

An exemplary embodiment of the present invention provides a walk-in apparatus provided in a vehicular seat, which includes: an actuator driven by manipulation of a walk-in manipulation unit of a user; a folding unit operated actuated by the actuator and folding a seat back forward; a tilting unit interlocking with the actuation of the folding unit and tilting the seat; and a sliding unit interlocking with the tilting unit and moving the seat forward, in which a link connecting the seat to the movable rail is restricted to rotation for tilting by an engagement structure.

In an exemplary embodiment, the folding unit may include a first lever rotated by a first cable connected to the actuator and releasing a folding restriction means of a recliner provided in the seat back.

In an exemplary embodiment, the tilting unit may include a second cable actuated by interlocking with the rotation of the first lever, and the engagement of the link may be released by interlocking with the actuation of the second cable to enable the seat to be tilted.

Further, the tilting unit may be tilted by a link pressing member provided in the link.

In addition, the tilting unit may include a second lever which rotates by the rotation of the first lever in contact with one end of the first lever, a third lever pulling the second cable by interlocking with the second lever, a fourth lever which rotates as the second cable is pulled, and a fifth lever interlocking with the fourth lever, and having a first protrusion having a gear shape at one side, and the first protrusion may be engaged with a second protrusion formed in the link to restrict the link.

In an exemplary embodiment, the link may include a first link of which one end is rotatably coupled to a front side of the movable rail and the other end is coupled to a front lower portion of the seat, and a second link of which one end is rotatably coupled to a rear side of the movable rail and the other end is coupled to a rear lower portion of the seat.

Further, the second link may be longer than the first link, and a link pressing member applying rotational force of tilting the seat may be provided in the second link.

In an exemplary embodiment, the link pressing member may be a torsion spring.

In an exemplary embodiment, the sliding unit may include a pressing means pressing the movable rail to slide to a front which is a driving direction of a vehicle, a sliding restriction means restricting the sliding of the movable rail, a sixth lever interlocking with the second link, and a seventh lever interlocking with the sixth lever and releasing sliding restriction by the sliding restriction means.

Further, the sliding restriction means may include restriction grooves formed at a predetermined interval in a longitudinal direction of a fixed rail, and an eighth lever including restriction protrusions inserted and coupled into the restriction grooves, and rotatably coupled to the movable rail, and the eighth lever may rotate in a direction in which the restriction protrusions of the eighth lever depart from the restriction grooves by the rotation of the seventh lever to release the sliding restriction.

According to an exemplary embodiment of the present invention, a walk-in apparatus can be provided, which has a mechanically simple configuration, and has an improved structure so as to achieve tilting and sliding simultaneously only by button manipulation of a user.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
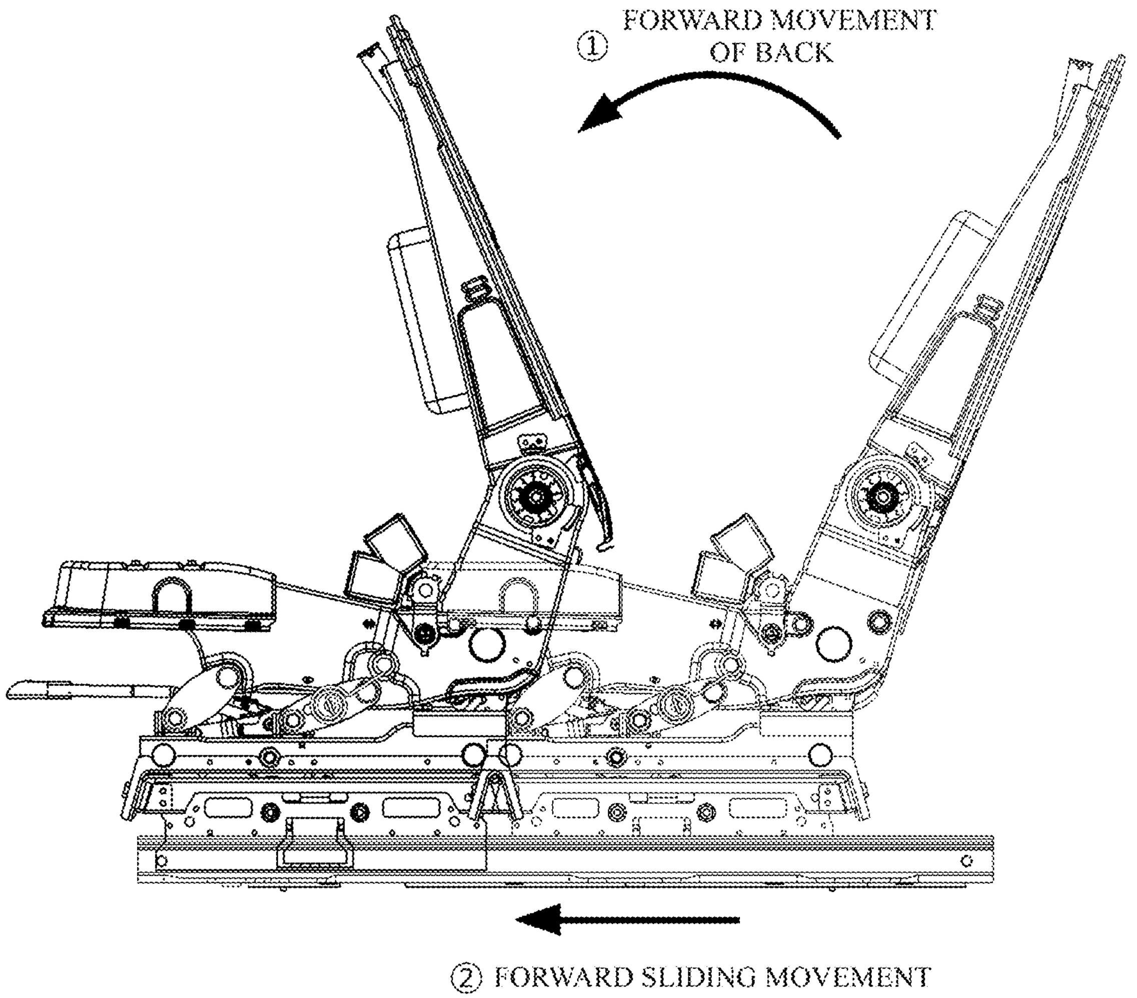
FIGS. 1 and 2 are diagrams describing an operation of a walk-in apparatus in the related art.
Figure 2:
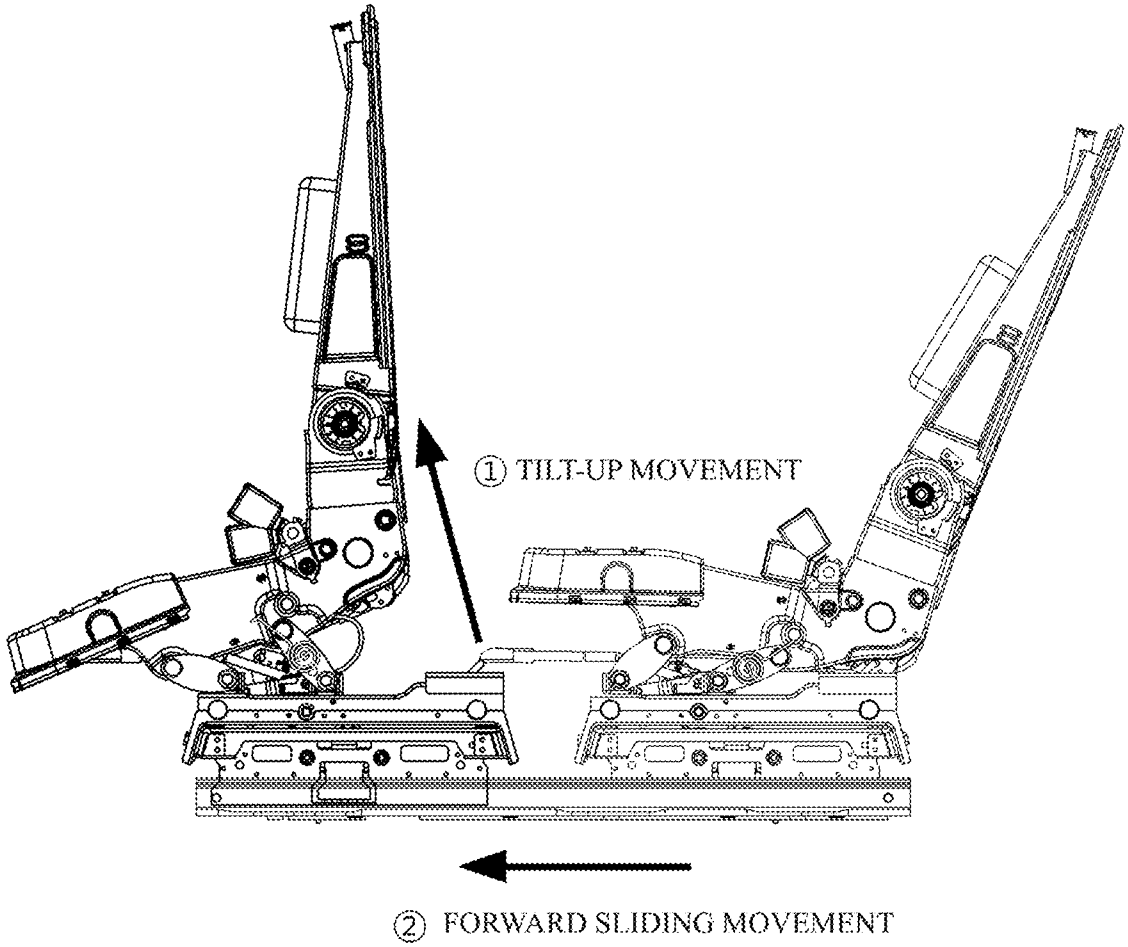

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

Figure 3:
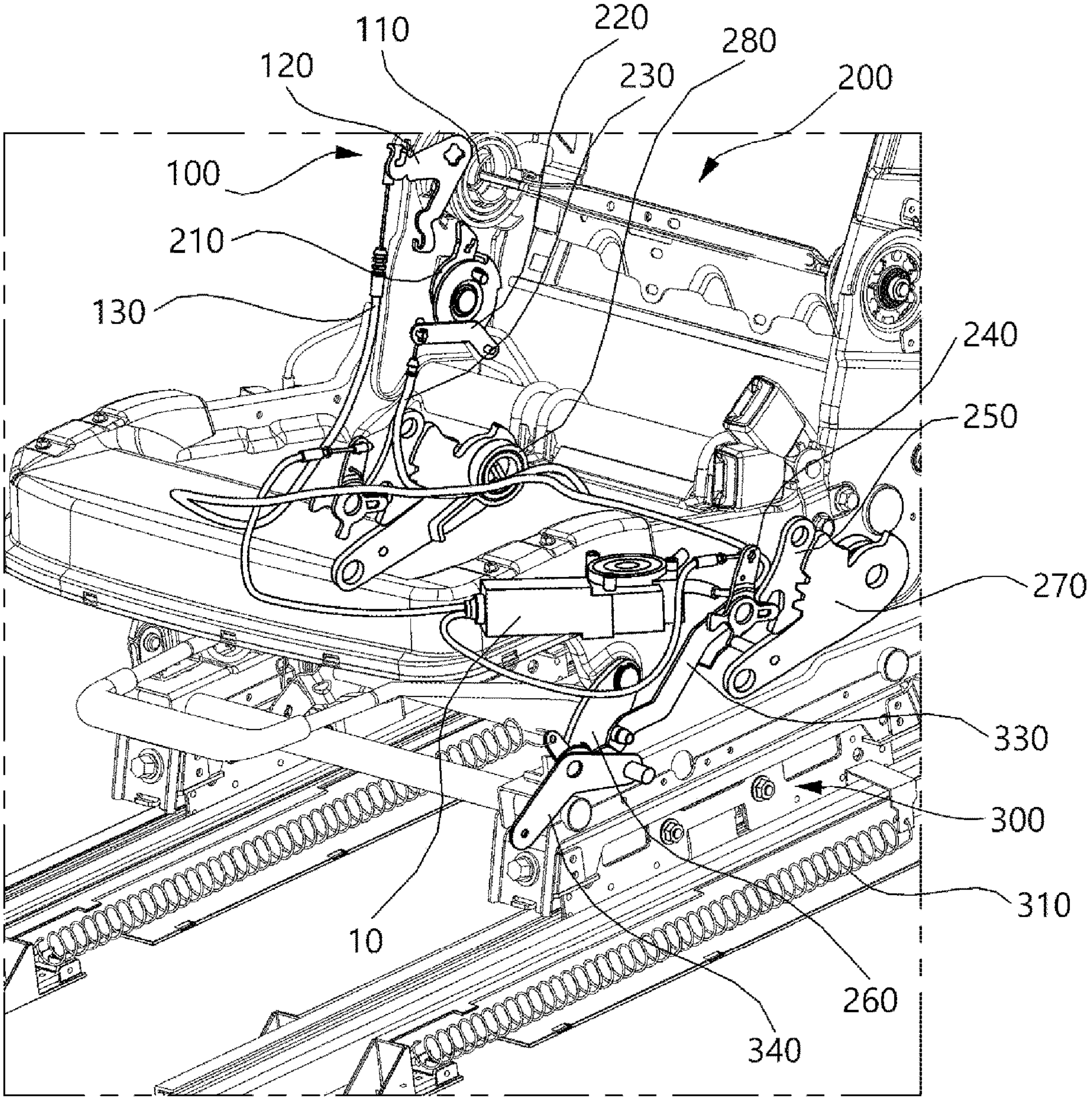
FIG. 3 is a diagram describing a walk-in apparatus according to an exemplary embodiment of the present invention.
Figure 4:
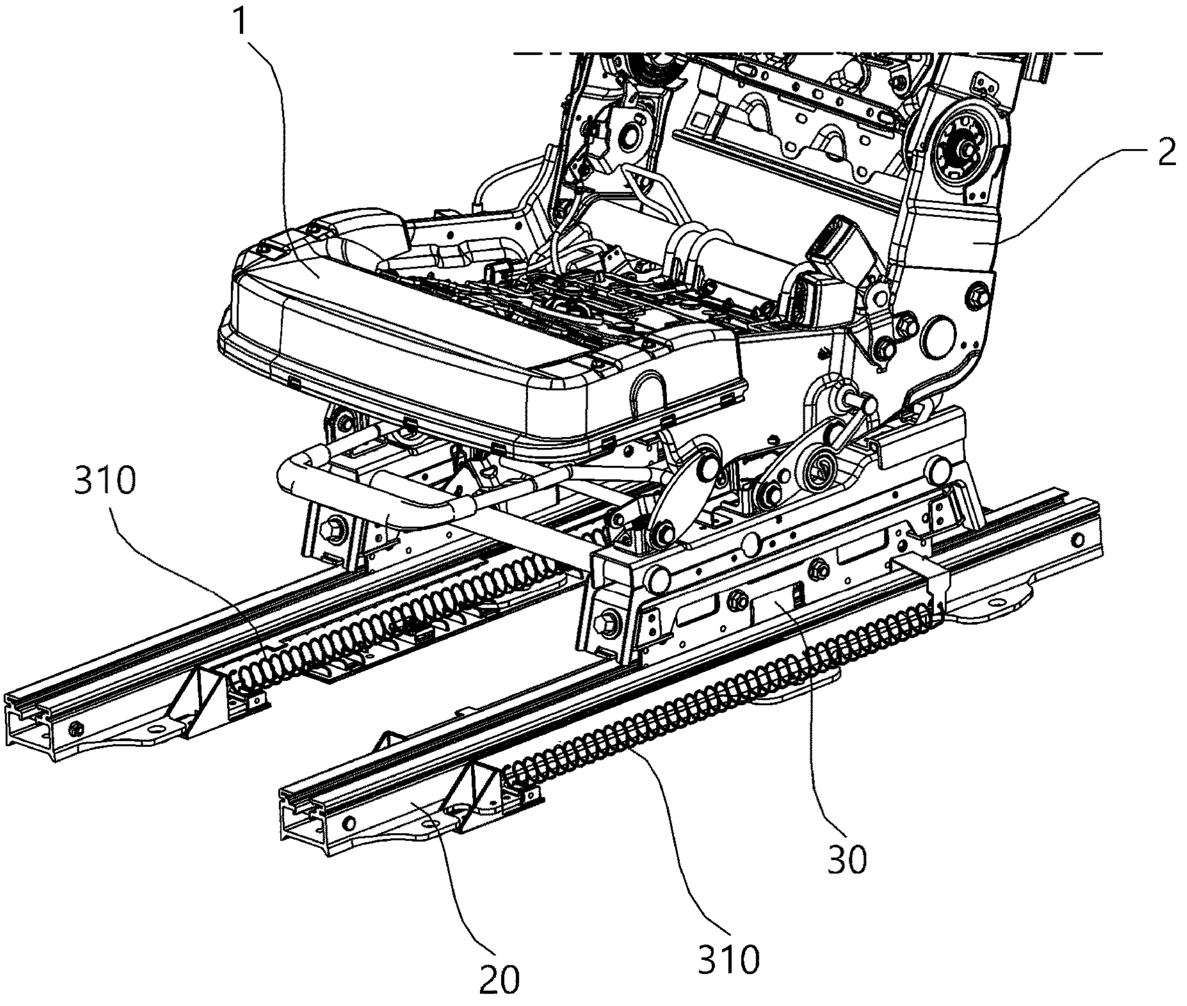
FIG. 4 is a diagram describing a relationship between a fixed rail and a movable rail, and a seat.
Figure 5:
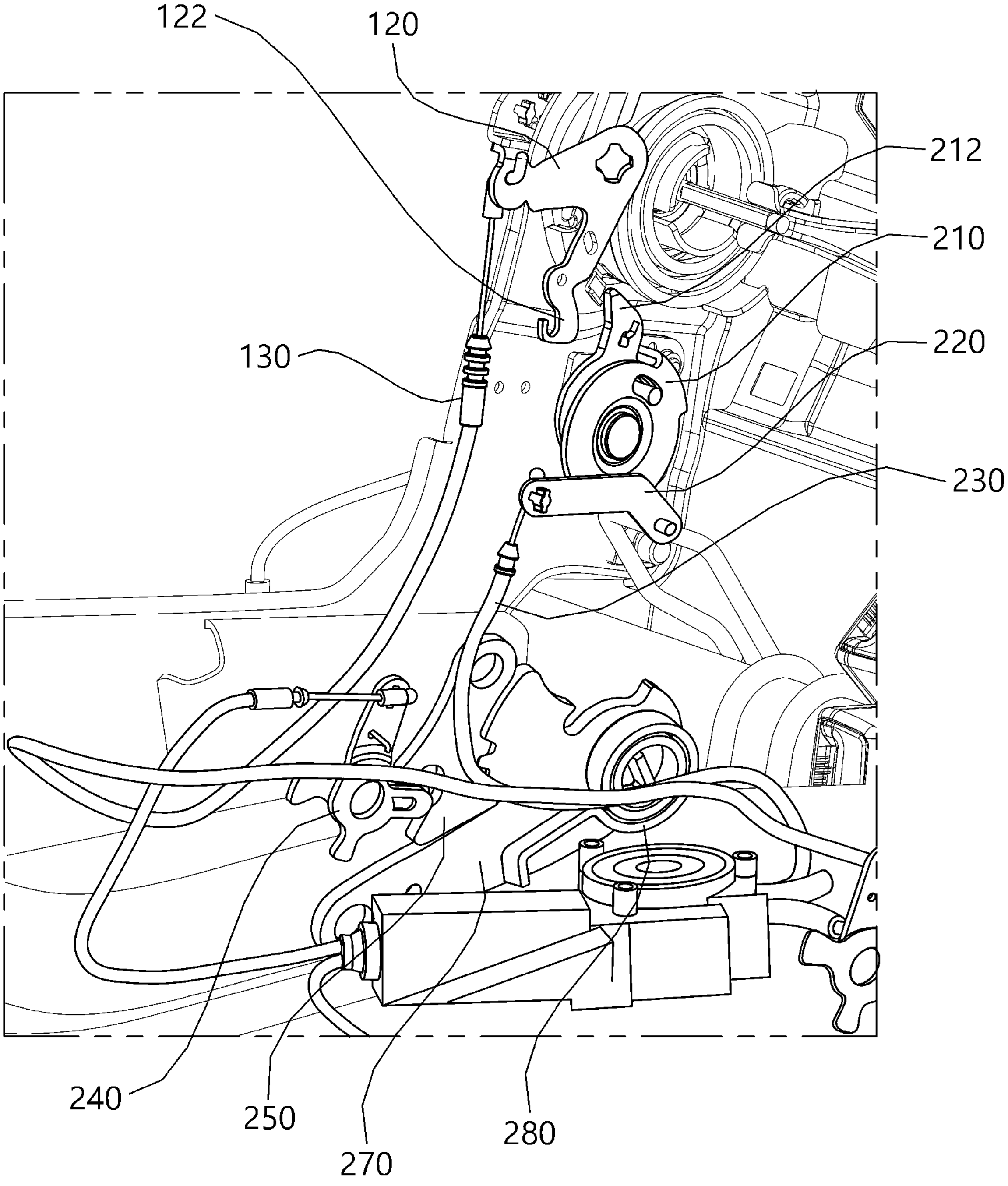
FIG. 5 is a diagram describing rotation of a first lever by driving of an actuator and the resulting folding of a seat back.
Figure 6:
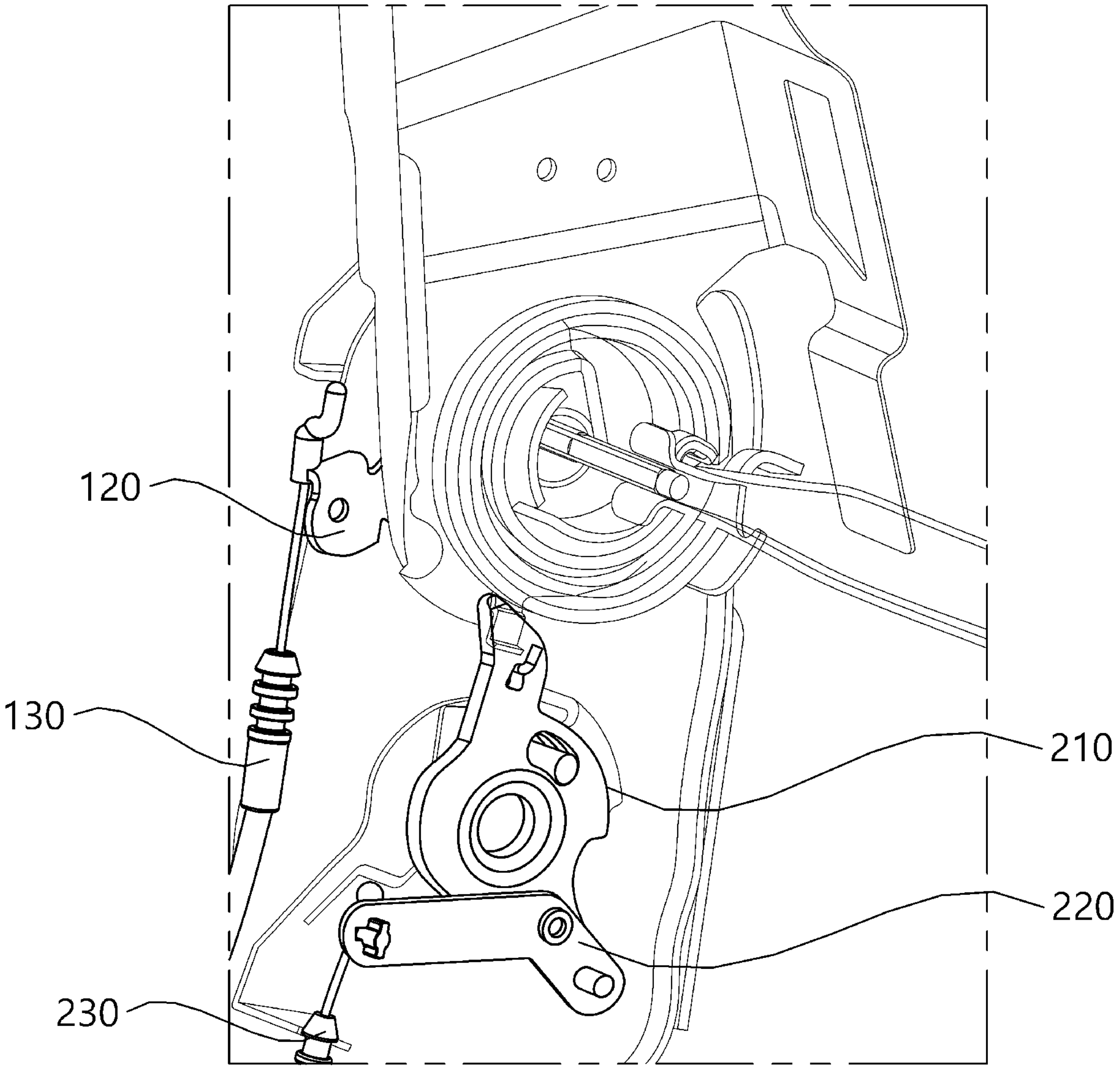
FIG. 6 is a diagram describing rotation of a second level and a third lever by the rotation of the first lever, and pulling of a second cable.
Figure 7:
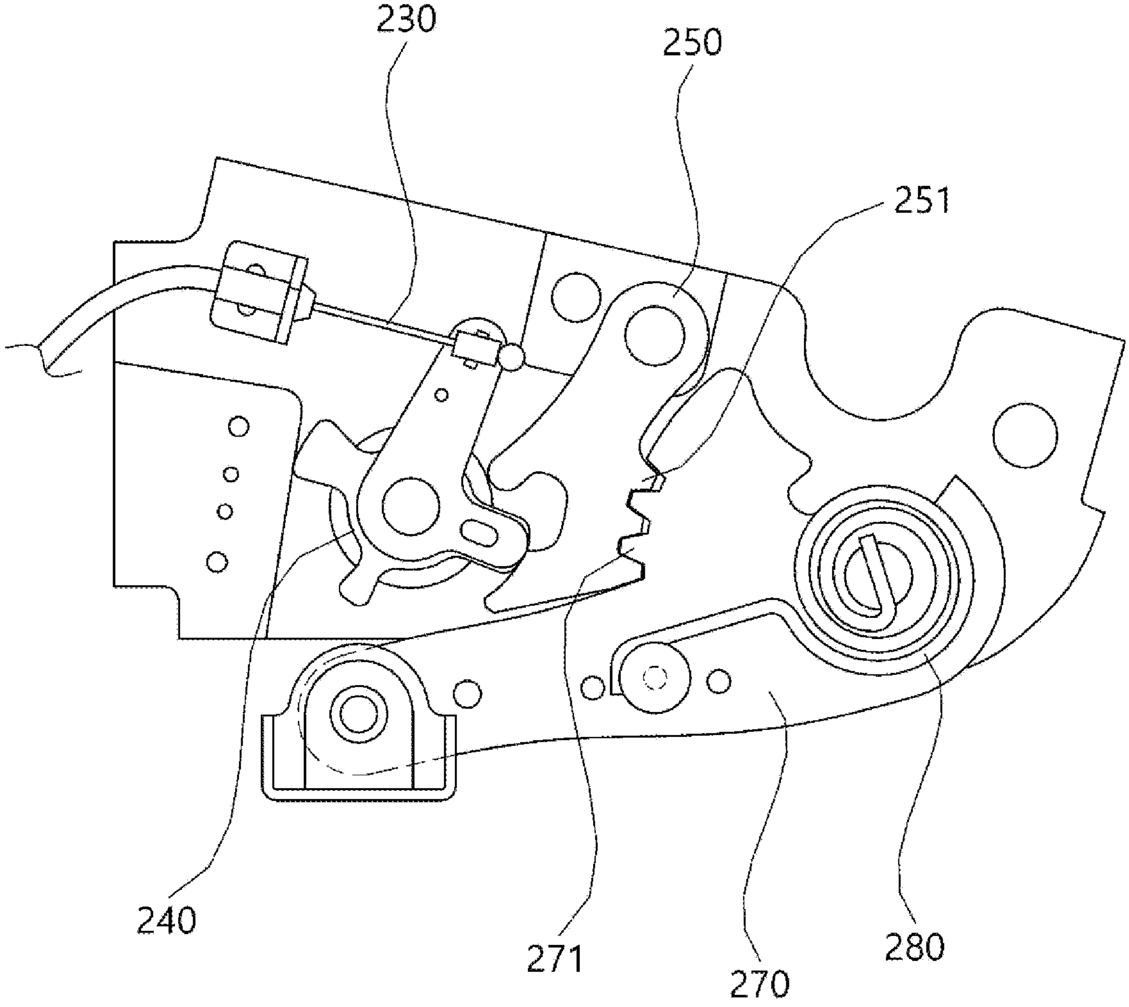
FIGS. 7 and 8 are diagrams describing that engagement of a sixth lever and a second link is released by rotation of the sixth lever.
Figure 8:
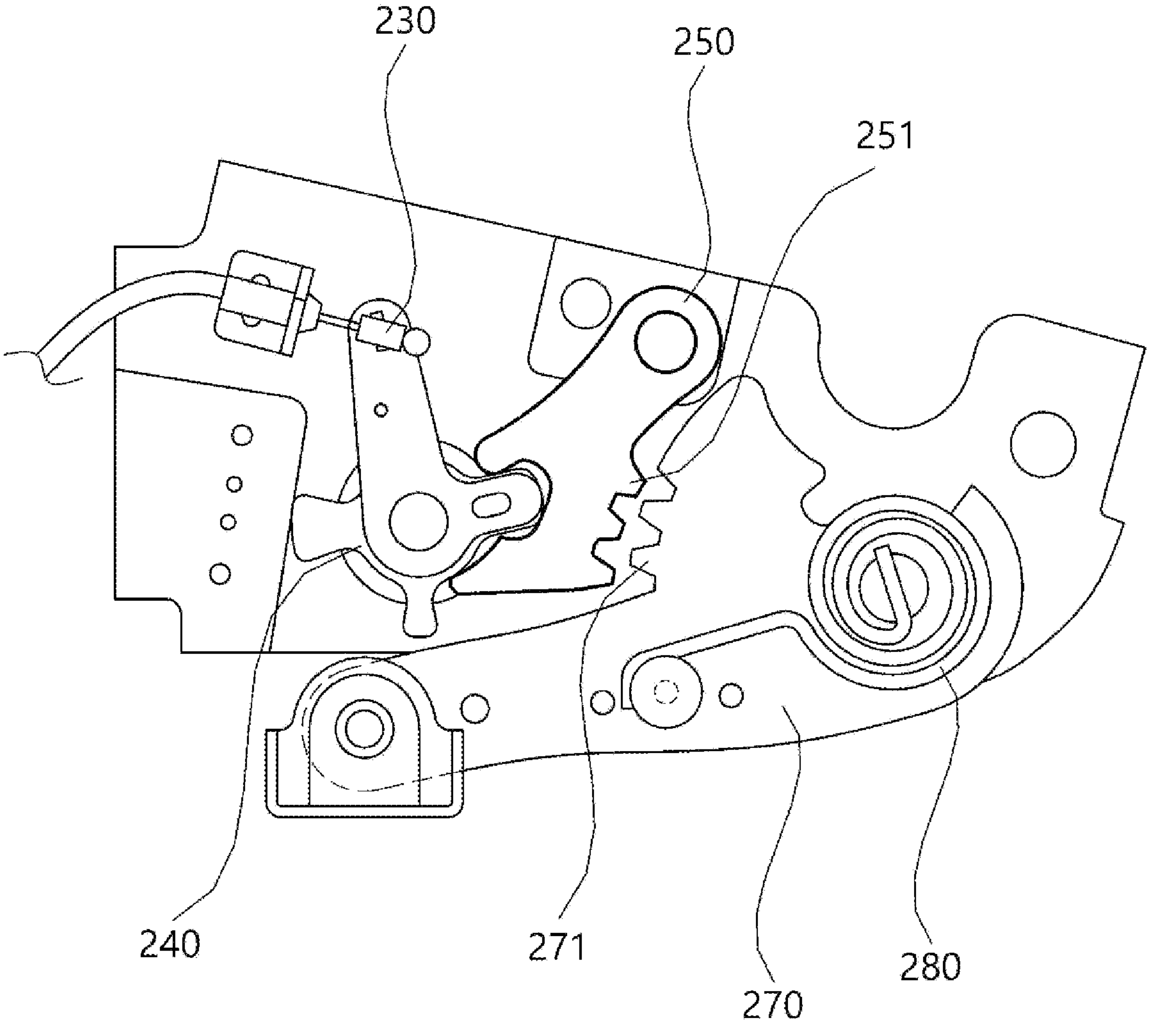
Figure 9:
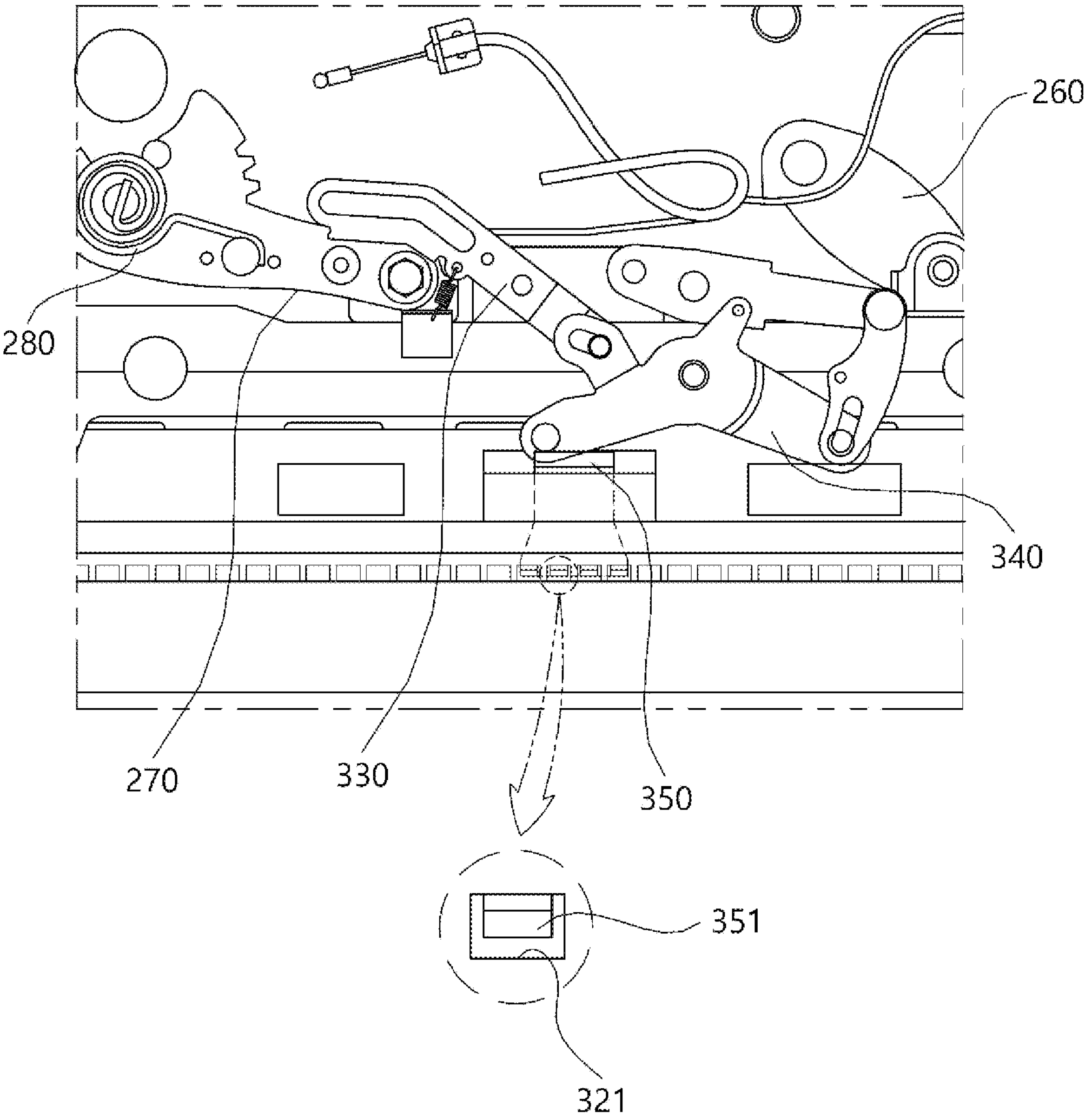
FIGS. 9 and 10 are diagrams describing that an eight protrusion rotates while a first link and the second link are rotated and the seat is tilted by a link pressing member.
Figure 10:
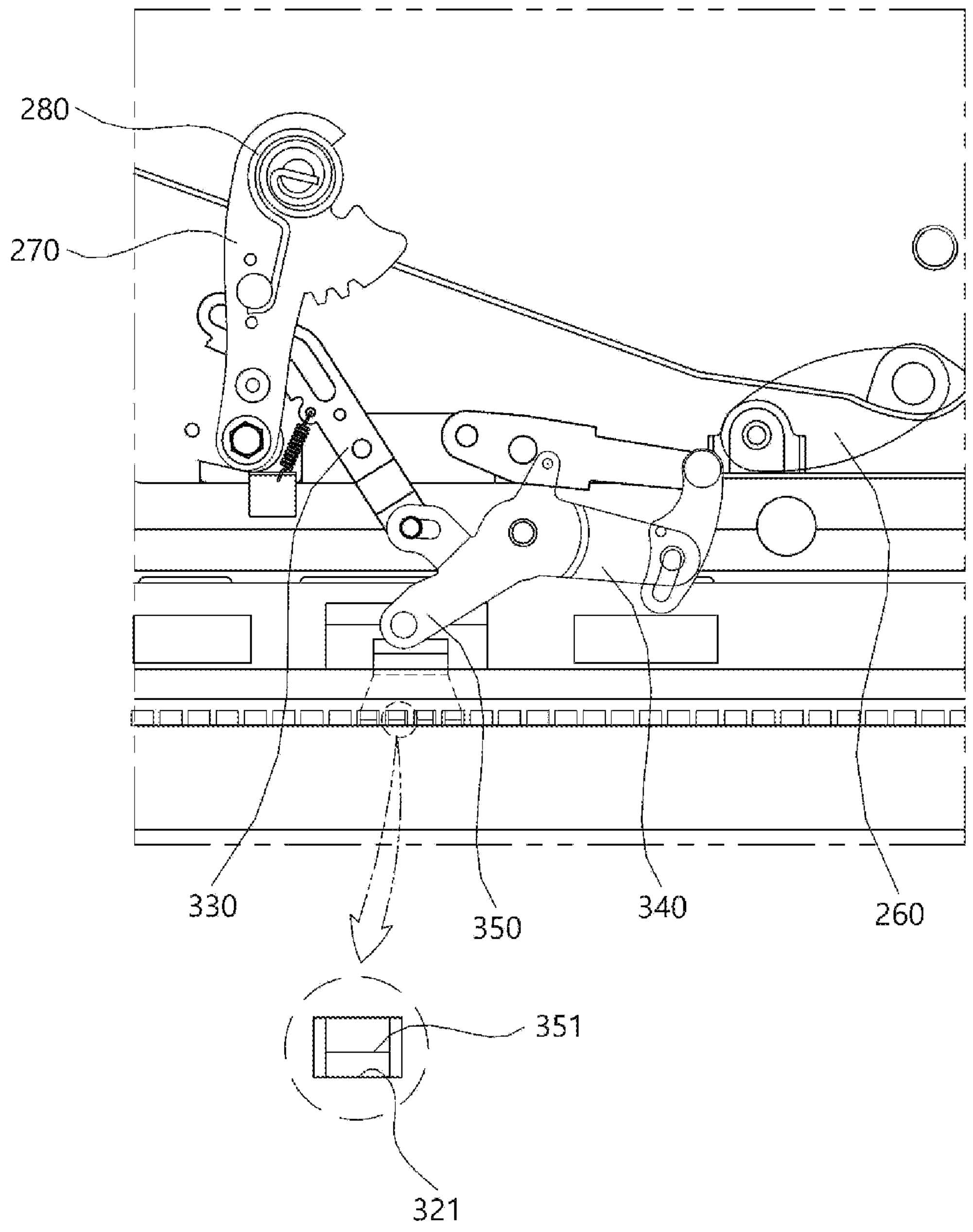
Figure 11:
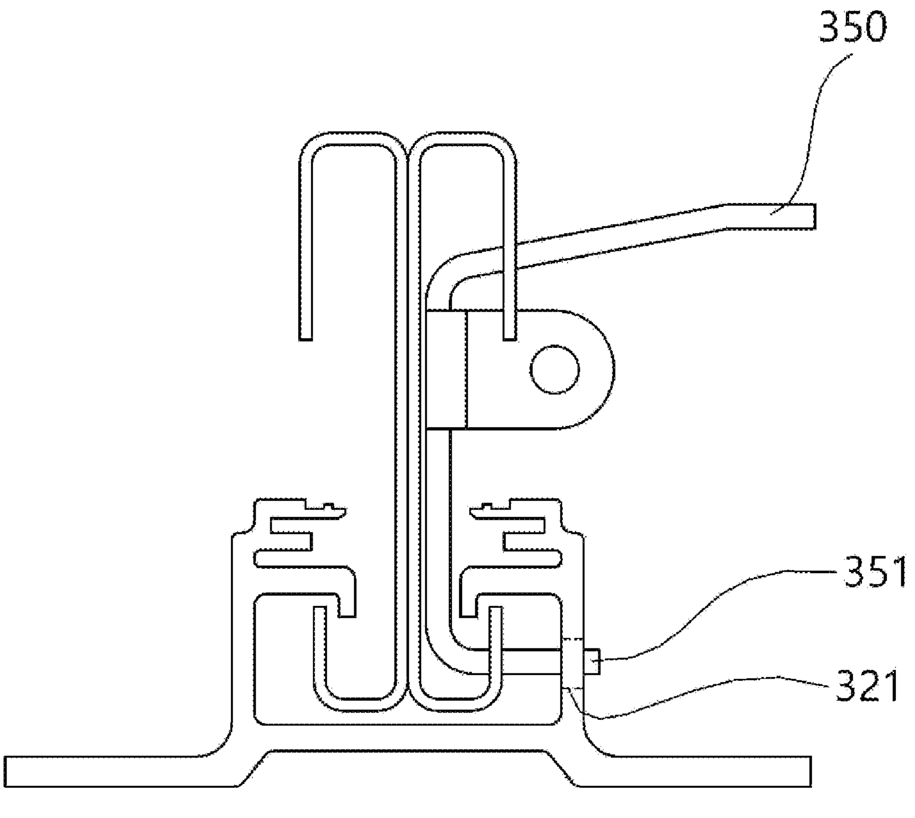
FIGS. 11 and 12 are diagrams describing that a restriction protrusion departs from a restriction groove while an eighth lever rotates.
Figure 12:
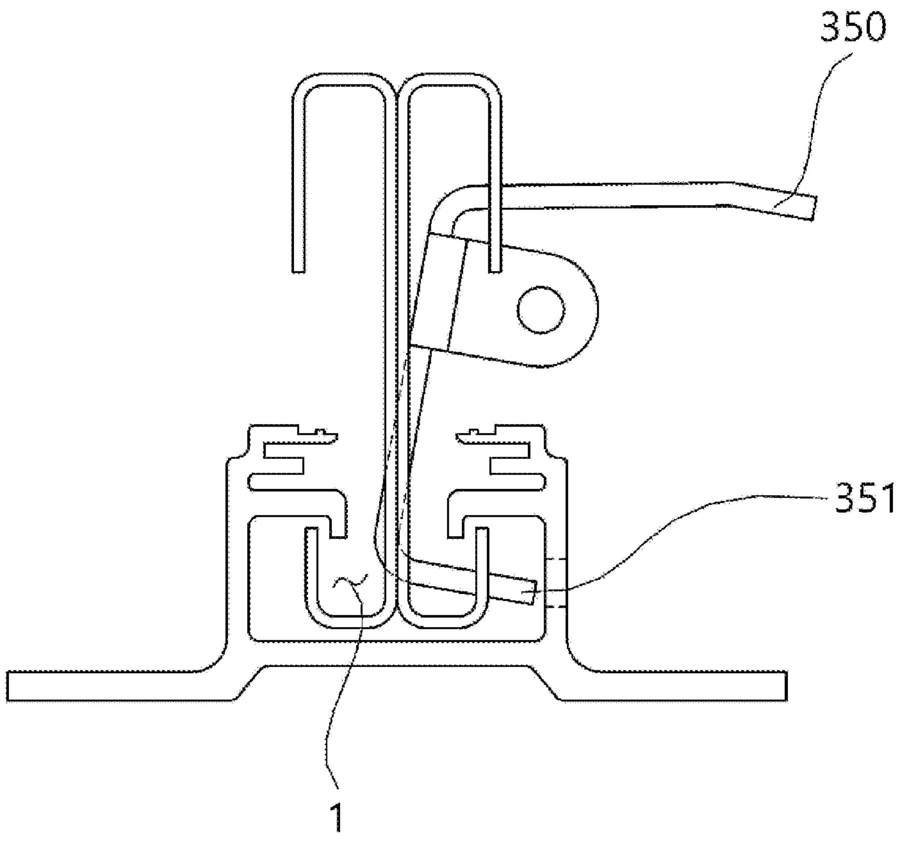
Figure 13:
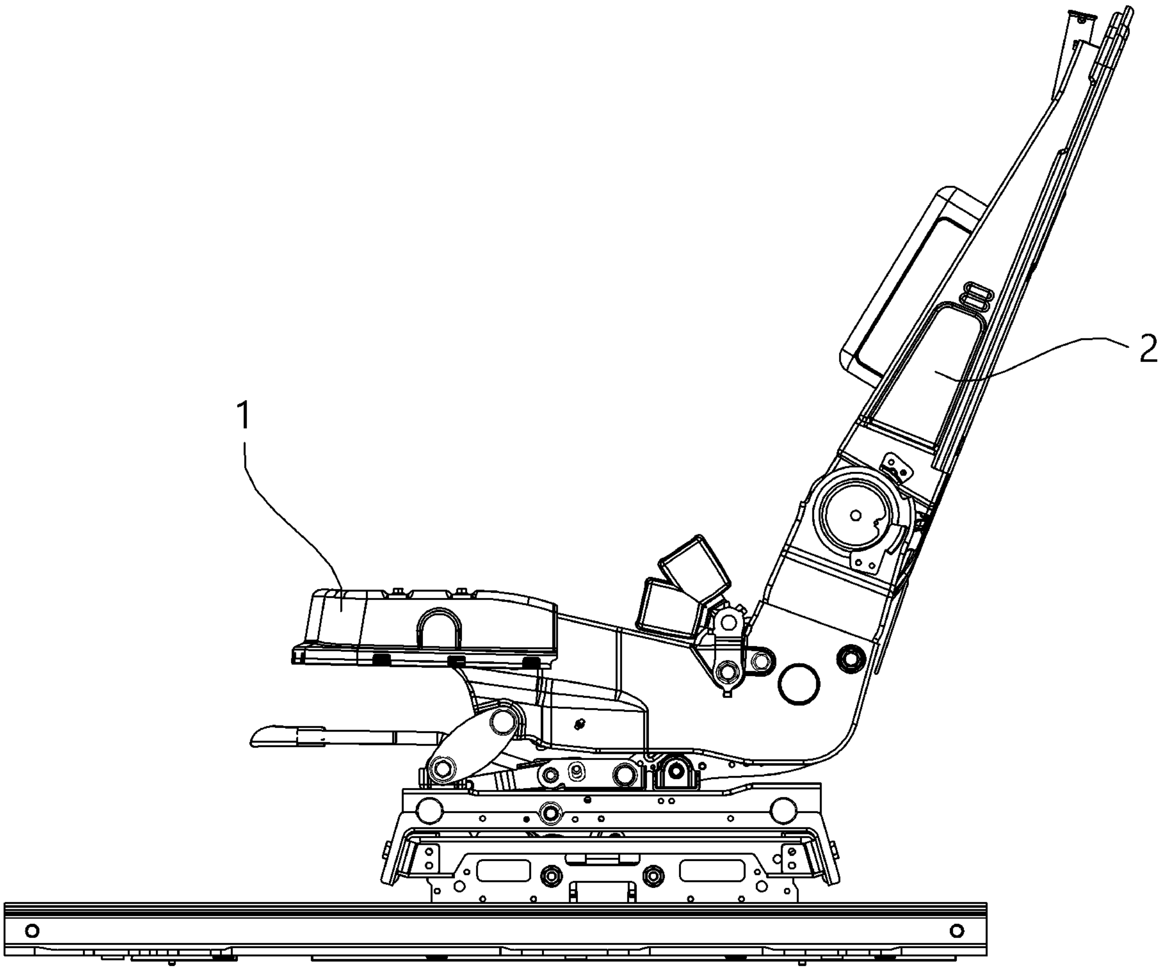
FIGS. 13 and 14 are diagrams comparing before and after an operation of the seat using the walk-in apparatus according to the exemplary embodiment.
Figure 14:
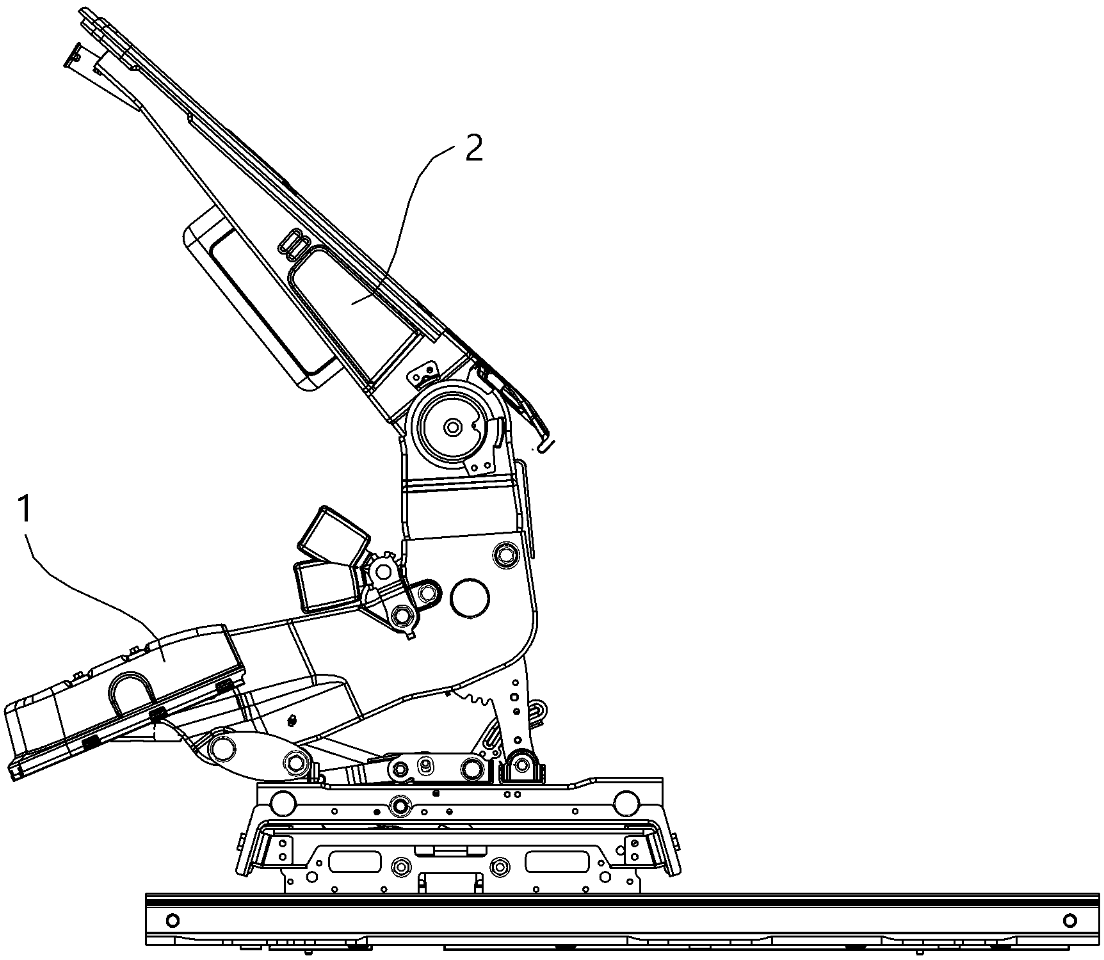

FIG. 3 is a diagram describing a walk-in apparatus according to an exemplary embodiment of the present invention, FIG. 4 is a diagram describing a relationship between a fixed rail and a movable rail, and a seat, FIG. 5 is a diagram describing rotation of a first lever by driving of an actuator and the resulting folding of a seat back, FIG. 6 is a diagram describing rotation of a second level and a third lever by the rotation of the first lever, and pulling of a second cable, FIGS. 7 and 8 are diagrams describing that engagement of a sixth lever and a second link is released by rotation of the sixth lever, FIGS. 9 and 10 are diagrams describing that an eight protrusion rotates while a first link and the second link are rotated and the seat is tilted by a link pressing member, FIGS. 11 and 12 are diagrams describing that a restriction protrusion departs from a restriction groove while an eighth lever rotates, and FIGS. 13 and 14 are diagrams comparing before and after an operation of the seat using the walk-in apparatus according to the exemplary embodiment.

The walk-in apparatus according to an exemplary embodiment of the present invention may include an actuator 10, a fixed rail 20, a movable rail 30, a folding unit 100, a tilting unit 200, and a sliding unit 300.

The actuator 10 is drive by manipulation of a walk-in manipulation unit of a user to perform an operation of pulling a first cable 110. As illustrated in FIG. 3, the actuator 10 may be installed below a seat 1. The actuator 10 is operated by mechanically interlocking with the manipulation of the walk-in manipulation unit of the user, but may be electrically operated by the manipulation of the walk-in manipulation unit of the user. In an exemplary embodiment, the walk-in manipulation unit may be configured in a button or lever type, and provided at one side of the seat 1 or a seat back 2. In an exemplary embodiment, the when the actuator 10 is a member which is electrically operated, such as a motor or a solenoid, the walk-in manipulation unit may be a button as a switch for operating the motor or solenoid.

Due to characteristics of a cable, force of pulling any one to the other one is transferred, but the force is not transferred even though the cable is pushed from any one side. A first cable 130, a second cable 230, and a third cable 350 to be described below are cables having the characteristics.

The walk-in manipulation unit for operating the actuator 10 is not illustrated, and may be installed on the seat 1 or the seat back 2, and an installation location may be determined by considering the accessibility of a vehicle user. In this case, the seat 1 is a part which supports a hip when a vehicle user sits, and the seat back 2 is a backrest.

As illustrated in FIG. 4, one pair of fixed rails 20 as rails which are fixed to a floor of a vehicle are provided, and one pair of fixed rails 20 are disposed to be in parallel to each other. A restriction groove 321 is installed in the fixed rail 20, which will be described below.

As illustrated in FIG. 4, the movable rail 30 is coupled to the seat 1 and moved forward and backward along the fixed rail 20 jointly with the seat 1. Hereinafter, a front refers to a forward direction of the vehicle and a rear means an opposite direction to the front.

Referring to FIGS. 3 and 5, the folding unit 100 as a component for folding the seat back 2 forward may include a recliner 110, a first lever 120, and the first cable 130.

The recliner 110 is a member which adjusts an angle of the seat back 2. The recliner 110 may include a spring, and the seat back 2 may be folded forward by elastic force of the spring provided in the recliner 110. The folding of the seat back 2 is restricted by a folding restriction means (not illustrated), and when the first lever 120 releases the restriction by the folding restriction means, the seat back 2 is folded forward by the spring provided in the recliner 110. The recliner 110 and the folding restriction means as components which restrict the folding of the seat back 2 may adopt a known means, so an additional description will be omitted.

The first lever 120 may be rotatably provided near the recliner 10, and when the actuator 10 pulls the first cable 130, the folding restriction of the seat back 2 by the folding restriction means is released while the first lever 120 is rotated, and rotational torque by the spring the recliner 110 is transferred to the seat back 2, which enables the seat back 2 to be folded forward.

The tilting unit 200 is a component that performs an operation of lifting a rear side of the seat 1 up, and the seat 1 may be rotated so that a rear side is moved up rather than a front side by actuating the tilting unit 200.

Referring to FIG. 3, the tilting unit 100 may include a second lever 210, a third lever 220, a second cable 230, a fourth lever 240, a fifth lever 250, a first link 260, a second link 270, and a link pressing member 280. In an exemplary embodiment, each one of the fourth lever 240, the fifth lever 250, the first link 260, the second link 270, and the link pressing member 280 may be installed at each of both sides of the seat 1.

Referring to FIGS. 5 and 6, the second lever 210 is rotatably coupled to a lower portion of the first lever 120, and interlocks with the first lever 120. In an exemplary embodiment, one end portion 122 of the first lever 120 and one end portion 212 of the second lever 210 are in contact with each other, so the end 122 of the first lever may transfer rotation driving force to the end 212 of the second lever 210 when the first lever 120 rotates. Interlocking means that when any one component of two components moves or rotates, the other component also moves or rotates jointly, and is described below.

The third lever 220 interlocks the second lever 210, and is connected to the second cable 230.

The second cable 220 is a cable in which one end is coupled to the third lever 220, and is pulled when the third lever 220 rotates. In the state in which one end of the second cable 230 is coupled to the third lever 220, the other end of the second cable 230 may be coupled to each fourth lever 240. When the fourth lever 240 is provided at each of a left side and a right side of the seat, the other end of the second cable 230 may be branched into two in order to actuate the fourth levers 240 at the left and right sides.

The fourth lever 240 as a component rotatably coupled to the lower portion of the seat 1 is connected to the other end of the second cable 230, and rotates when the second cable 230 is pulled.

Referring to FIGS. 7 and 8, the fifth lever 250 interlocks with the fourth lever 240, and a first protrusion 251 having a gear shape is formed at one side of the fifth lever 250.

One end of the first link 260 is coupled to a front side of the movable rail 30, and the other end is coupled to the front side of the seat 1. When the second link 270 rotates by the link pressing member 260, the first link 260 tilts the seat 1 jointly with the second link 270.

One end of the second link 270 is coupled to a rear side of the movable rail 30, and the other end is coupled to a rear side of the seat 1, and the rear side of the seat 1 is lifted up while one end coupled to the movable rail 30 rotates on an axis by the link pressing member 280. To this end, the second link 270 may be formed to be longer than the first link 260. However, in the exemplary embodiment of the present invention, it may be possible that the link pressing member 280 is also provided in the first link 260.

A second protrusion 271 having a form to be engaged with the first protrusion 251 of the fifth lever 250 is formed in the second link 270.

The link pressing member 280 is a component that presses the first link 260 or the second link 270 in a direction in which the first link 240 and the second link 270 lift up the rear side of the seat 1, and in the exemplary embodiment, the link pressing member 280 is installed to press the second link 270. As the link pressing member 280, a torsion spring may be used.

As illustrated in FIG. 7, in the state in which the first protrusion 251 and the second protrusion 271 are engaged with each other, the rotation of the second link 270 is restricted, so the link pressing member 280 may rotate the second link 270, and as illustrated in FIG. 8, in the engagement of the first protrusion 251 and the second protrusion 271 is released by the rotation of the fifth lever 250, the second link 270 may freely rotate, so the seat 1 may be tilted while the first link 260 and the second link 270 rotate by the elastic restoration force of the link pressing member 280.

FIG. 9 illustrates a state before the seat 1 is tilted as in a state illustrated in FIG. 11 as a state before the first link 260 and the second link 270 rotate, and FIG. 10 illustrates a state in which the seat 1 is tilted as illustrated in FIG. 12 as a state in which the first link 260 and the second link 270 rotate by the link pressing member 280.

The sliding unit 300, which is to simultaneously slide the seat 1 and the seat back 2 forward, includes a pressing means 310, a sliding restriction means, the sixth lever 330, and the seventh lever 340.

The pressing means 310 as a component that presses the movable rail 30 coupled to the seat 1 to slide forward may adopt a coil spring in which one end is fixed to the fixed rail 20 and the other end is fixed to the movable rail 30 as illustrated in FIG. 4. As illustrated in FIG. 12, a coil spring which is the pressing means 310 is stretched (elastically transformed) before the seat 1 slides.

The sliding restriction means as a component that restricts sliding of the movable rail 30 includes restriction grooves 321 which are grooves formed at a predetermined interval in the fixed rail 20 in a longitudinal direction of the fixed rail, and an eighth lever 350.

As illustrated in FIG. 9, the restriction groove 321 may also be manufactured in the form of a through-hole.

The eighth lever 350 includes a restriction protrusion 351 inserted and coupled into the restriction groove 321. There may be several restriction protrusions 351.

FIG. 11 illustrates a state in which the restriction protrusion 351 is inserted into the restriction groove 321, and FIG. 12 illustrates a state in which the restriction protrusion 351 departs from the restriction groove 321 by rotation of the eighth lever 350.

The sixth lever 330 interlocks with the second link 270, and the seventh lever 340 interlocks with the sixth lever 330 to release the restriction of the sliding by the sliding restriction means, and when the seventh lever 340 rotates, the eighth lever 350 rotates in a direction in which the restriction protrusion 351 departs from the restriction groove 321 as illustrated in FIG. 11 while interlocking with the seventh lever 340.

When the restriction protrusion 351 departs from the restriction groove 321, the movable rail 30 and the seat 1 slide forward by elastic restoration force of the coil spring which is the pressing means 310.

Hereinafter, by describing the method for driving the seat 1 and the seat back 2 by the walk-in apparatus according to the above-described configuration, a function, an action, and an effect each configuration described will be described.

In order for the user of the vehicle to drive the seat 1 and the seat back 2 from the state illustrated in FIG. 13 to the state illustrated in FIG. 14 boarding, the walk-in manipulation unit is manipulated to drive the actuator 10. The actuator 10 pulls the first cable 130 to rotate the first lever 120, and the restriction of the folding restriction means is released while the first lever 120 rotates, and as a result, the recliner 110 folds the seat back. As described above, since the recliner 110 may adopt a known component, a description of a folding mechanism by the recliner 110 will be omitted.

When the first lever 120 rotates, the second lever 210 and the third lever 220 rotate jointly by interlocking with each other.

When the second cable 230 is pulled by the rotation of the third lever 220, the fourth lever 240 connected to the second cable 230 rotates.

When the fourth lever 240 rotates, the engagement of the first protrusion 251 of the fifth l ever 250 and the second protrusion 271 of the second link 270 is released while the fifth lever 250 and the fourth lever 240 interlock with each other, so the second link 270 freely rotates. The state in which the first protrusion 251 and the second protrusion 271 are engaged with each other is illustrated in FIG. 7, and the state in which the engagement is released is illustrated in FIG. 8.

When the second link 270 freely rotates, the seat 1 is tilted while the first link 260 and the second link 270 rotate by the elastic restoration force of the torsion spring.

In the process in which the seat 1 is tilted, the first link 260 and the second link 270 rotate, and when the second link 270 rotates, the sixth lever 330 rotates jointly (see FIGS. 9 and 10).

The sixth lever 330 interlocks with the seventh lever 340, which rotates jointly by the rotation of the sixth lever 330. When the seventh lever 340 rotates, the restriction protrusion 351 departs from the restriction groove 321 while the eight lever 350 rotates, which interlocks with the seventh lever 340 (see FIGS. 11 and 12).

When the restriction protrusion 351 departs from the restriction groove 321, the seat 1 slides forward by the elastic restoration force of the coil spring which is the pressing means 310, and becomes the state illustrated in FIG. 14.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A walk-in apparatus provided in a vehicle seat, comprising:

an actuator configured to be driven by manipulation of a walk-in manipulation unit;

a folding unit configured to be actuated by the actuator to fold a seat back forward;

a tilting unit interlocking with actuation of the folding unit and configured to tilt the seat; and a sliding unit interlocking with the tilting unit and configured to move the vehicle seat forward, wherein a link connecting the vehicle seat to a movable rail is restricted to rotation for tilting by an engagement structure.

2. The walk-in apparatus of claim 1, wherein the folding unit includes a first lever configured to be rotated by a first cable connected to the actuator and configured to release a folding restriction means of a recliner provided in the seat back.

3. The walk-in apparatus of claim 2, wherein the tilting unit includes a second cable configured to be actuated by interlocking with rotation of the first lever, and wherein an engagement of the link is released by interlocking with the actuation of the second cable to enable the vehicle seat to be tilted.

4. The walk-in apparatus of claim 3, wherein the tilting unit is tilted by a link pressing member provided in the link.

5. The walk-in apparatus of claim 3, wherein the tilting unit includes a second lever configured to rotate by rotation of the first lever in contact with one end of the first lever, a third lever configured to pull the second cable by interlocking with the second lever, a fourth lever configured to rotate as the second cable is pulled, and a fifth lever configured to interlock with the fourth lever, and having a first protrusion having a gear shape at one side, and wherein the first protrusion is engaged with a second protrusion defined in the link to restrict the link.

6. The walk-in apparatus of claim 5, wherein the link includes a first link having one end rotatably coupled to a front side of the movable rail and another end coupled to a front lower portion of the vehicle seat, and a second link having one end rotatably coupled to a rear side of the movable rail and another end coupled to a rear lower portion of the vehicle seat.

7. The walk-in apparatus of claim 6, wherein the second link is longer than the first link, and a link pressing member applying rotational force for tilting the vehicle seat is provided in the second link.

8. The walk-in apparatus of claim 7, wherein the link pressing member of the second link is a torsion spring.

9. The walk-in apparatus of claim 6, wherein the sliding unit includes a pressing means pressing the movable rail to slide to a front which is a driving direction of a vehicle, a sliding restriction means restricting sliding of the movable rail, a sixth lever interlocking with the second link, and a seventh lever interlocking with the sixth lever and releasing sliding restriction by the sliding restriction means.

10. The walk-in apparatus of claim 9, wherein the sliding restriction means includes:

restriction grooves defined at a predetermined interval in a longitudinal direction of a fixed rail, and an eighth lever including restriction protrusions inserted and coupled into the restriction grooves, and rotatably coupled to the movable rail, and wherein the eighth lever rotates in a direction in which the restriction protrusions of the eighth lever depart from the restriction grooves by rotation of the seventh lever to release the sliding restriction.

* * * * *